United States Patent
Kiriaki

(10) Patent No.: US 12,410,713 B2
(45) Date of Patent: Sep. 9, 2025

(54) TURBINE AND TURBOCHARGER

(71) Applicant: IHI Corporation, Tokyo (JP)

(72) Inventor: Takuro Kiriaki, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/327,149

(22) Filed: Jun. 1, 2023

(65) Prior Publication Data

US 2023/0304406 A1    Sep. 28, 2023

Related U.S. Application Data

(63) Continuation of application No. PCT/JP2022/006385, filed on Feb. 17, 2022.

(30) Foreign Application Priority Data

Mar. 17, 2021    (JP) .................. 2021-044156

(51) Int. Cl.
  *F01D 5/14* (2006.01)
  *F02B 37/00* (2006.01)

(52) U.S. Cl.
  CPC .............. *F01D 5/141* (2013.01); *F02B 37/00* (2013.01); *F05D 2220/40* (2013.01); *F05D 2240/303* (2013.01)

(58) Field of Classification Search
  CPC .......... F01D 5/141; F01D 5/142; F01D 5/143; F01D 5/144; F01D 5/145; F01D 5/146; F05D 2220/40; F05D 2240/303; F02C 6/12
  See application file for complete search history.

(56) References Cited

U.S. PATENT DOCUMENTS

| | | | |
|---|---|---|---|
| 2,797,858 A | 7/1957 | Nuell | |
| 6,877,955 B2* | 4/2005 | Higashimori | F01D 5/14 416/185 |
| 9,777,578 B2* | 10/2017 | Yokoyama | F01D 5/04 |
| 10,941,662 B2* | 3/2021 | Keating | F01D 5/048 |

(Continued)

FOREIGN PATENT DOCUMENTS

| | | |
|---|---|---|
| JP | H08-109801 A | 4/1996 |
| JP | 10-504621 A | 5/1998 |

(Continued)

OTHER PUBLICATIONS

Machine translation of WO-2021018882-A1, Lehmayr B, published Feb. 4, 2021 (Year: 2021).*

(Continued)

*Primary Examiner* — Nathaniel E Wiehe
*Assistant Examiner* — Jason G Davis
(74) *Attorney, Agent, or Firm* — Oblon, McClelland, Maier & Neustadt, L.L.P.

(57) ABSTRACT

A turbine includes: a turbine scroll flow path; a turbine blade wheel disposed on a radially inner side with respect to the turbine scroll flow path; and a blade included in the turbine blade wheel, the blade having a leading edge inclined to a side opposite to a rotation direction side of the turbine blade wheel as the leading edge extends from a hub side to a shroud side, the leading edge having an inclination angle greater than 0° and less than or equal to 45° with respect to an axial direction of the turbine blade wheel as viewed in the radial direction.

2 Claims, 5 Drawing Sheets

(56) References Cited

U.S. PATENT DOCUMENTS

| | | | |
|---|---|---|---|
| 11,156,095 B2* | 10/2021 | Mohamed | F01D 5/141 |
| 11,220,908 B2* | 1/2022 | Gugau | F01D 5/048 |
| 2015/0086396 A1 | 3/2015 | Nasir | |
| 2015/0330226 A1 | 11/2015 | Yokoyama et al. | |
| 2015/0361802 A1 | 12/2015 | Yoshida et al. | |
| 2016/0160653 A1* | 6/2016 | Choi | F01D 5/18 |
| | | | 416/223 A |
| 2017/0292381 A1* | 10/2017 | Ishii | F01D 5/04 |
| 2021/0032993 A1* | 2/2021 | Mohamed | F01D 5/048 |

FOREIGN PATENT DOCUMENTS

| | | |
|---|---|---|
| JP | 2007-23894 A | 2/2007 |
| JP | 2008-133766 A | 6/2008 |
| JP | 2011-7141 A | 1/2011 |
| JP | WO2014/102981 | 7/2014 |
| JP | 2016-53352 A | 4/2016 |
| WO | WO 2014/128898 A1 | 8/2014 |
| WO | WO-2021018882 A1 * | 2/2021 ............. F01D 5/021 |

OTHER PUBLICATIONS

International Search Report issued Apr. 5, 2022 in PCT/JP2022/006385 filed on Feb. 17, 2022, 2 pages.
Japanese Office Action issued on Nov. 7, 2023 in Japanese Patent Application No. 2023-506888, 3 pages.
Mohammed Amine Chelabi et al., Effects of Cone Angle and Inlet Blade Angle on Mixed Inflow Turbine Performances; Periodica Polytechnica Mechanical Engineering, 61(3), 2017, pp. 225-233.

* cited by examiner

TURBINE AND TURBOCHARGER

CROSS REFERENCE TO RELATED APPLICATIONS

This application is a continuation application of International Application No. PCT/JP2022/006385, filed on Feb. 17, 2022, which claims priority to Japanese Patent Application No. 2021-044156, filed on Mar. 17, 2021, the entire contents of which are incorporated by reference herein.

BACKGROUND ART

Technical Field

The present disclosure relates to a turbine and a turbocharger. The present application claims the benefit of priority based on Japanese Patent Application No. 2021-044156 filed on Mar. 17, 2021, the content of which is incorporated herein.

Related Art

Some turbines included in a turbocharger and the like are of a type in which gas flows into a turbine blade wheel from a radially outer side. As such a type of turbine, for example, Patent Literature 1 discloses a radial turbine in which gas flows in a radial direction. Note that turbines into which gas flows in a direction inclined with respect to the radial direction are referred to as diagonal flow turbines.

CITATION LIST

Patent Literature

Patent Literature 1: WO 2014/128898 A

SUMMARY

Technical Problem

In turbines of a type in which gas flows into a turbine blade wheel from a radially outer side, at a gas inlet portion of the turbine blade wheel (namely, a portion of the turbine blade wheel into which the gas flows), depending on operation conditions, separation of the gas flow may occur, and a vortex may be generated. If separation of the gas flow occurs at the gas inlet portion in the turbine blade wheel, the efficiency of the turbine decreases.

An object of the present disclosure is to provide a turbine and a turbocharger capable of improving efficiency of the turbine.

Solution to Problem

In order to solve the above disadvantage, a turbine of the present disclosure includes: a turbine scroll flow path; a turbine blade wheel disposed on a radially inner side with respect to the turbine scroll flow path; and a blade included in the turbine blade wheel, the blade having a leading edge inclined to a side opposite to a rotation direction side of the turbine blade wheel as the leading edge extends from a hub side to a shroud side, the leading edge having an inclination angle greater than 0° and less than or equal to 45° with respect to an axial direction of the turbine blade wheel as viewed in the radial direction.

The inclination angle of the leading edge may be within a range of 10° to 30°.

The leading edge may have a linear shape.

In order to solve the above disadvantage, the turbocharger of the present disclosure includes the turbine described above.

Effects of Disclosure

According to the present disclosure, efficiency of a turbine can be improved.

DESCRIPTION OF EMBODIMENTS

Embodiments of the present disclosure will be described below by referring to the accompanying drawings. Dimensions, materials, other specific numerical values, and the like illustrated in the embodiments are merely an example for facilitating understanding, and the present disclosure is not limited thereto unless otherwise specified. Note that, in the present specification and the drawings, components having substantially the same function and structure are denoted by the same symbol, and redundant explanations are omitted. Illustration of components not directly related to the present disclosure is omitted.

Figure 1:
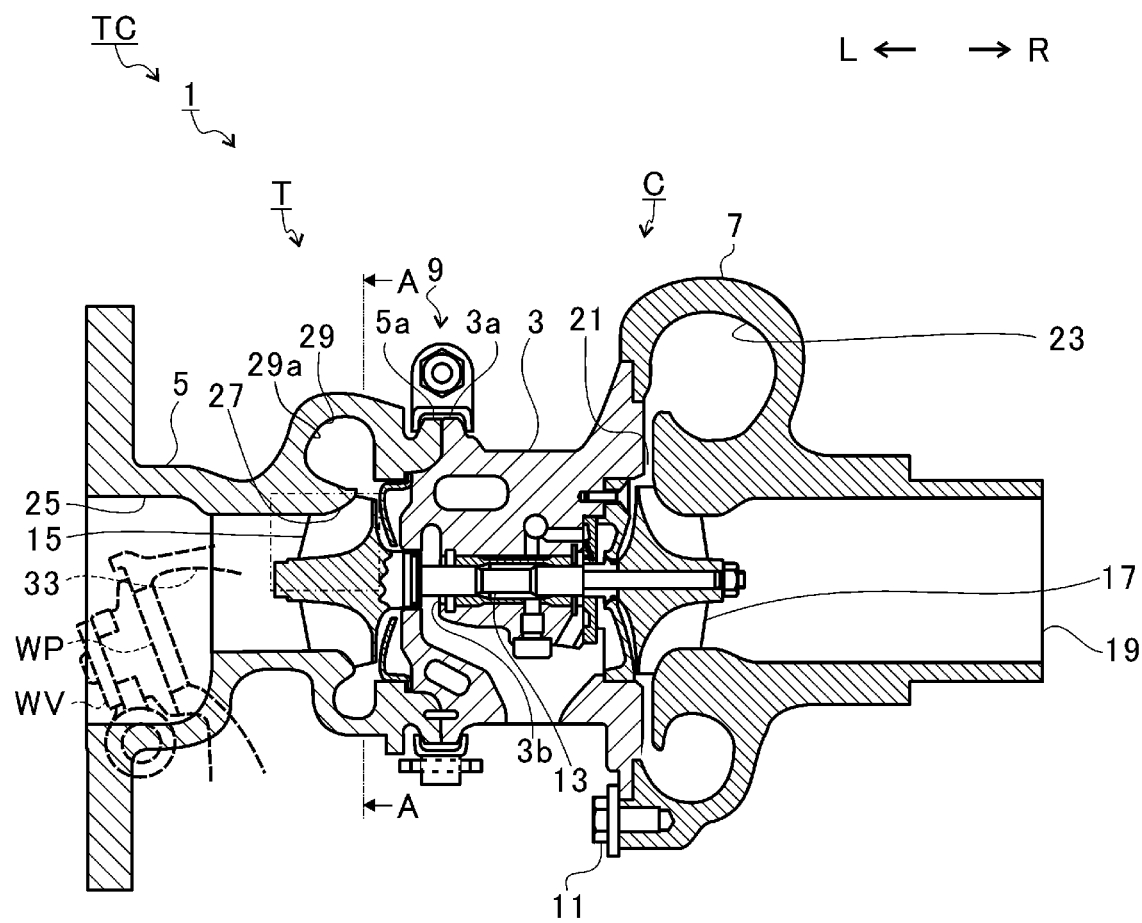
FIG. 1 is a schematic cross-sectional view illustrating a turbocharger according to an embodiment of the present disclosure.

FIG. 1 is a schematic cross-sectional view of a turbocharger TC. Hereinafter, description is given on the premise that the direction of an arrow L illustrated in FIG. 1 is the left side of the turbocharger TC. Description is given on the premise that the direction of an arrow R illustrated in FIG. 1 is the right side of the turbocharger TC. As illustrated in FIG. 1, the turbocharger TC includes a turbocharger main body 1. The turbocharger main body 1 includes a bearing housing 3, a turbine housing 5, and a compressor housing 7. The turbine housing 5 is connected to the left side of the bearing housing 3 by a fastening mechanism 9. The compressor housing 7 is connected to the right side of the bearing housing 3 by a fastening bolt 11. The turbocharger TC includes a turbine T and a centrifugal compressor C. The turbine T includes the bearing housing 3 and the turbine housing 5. The centrifugal compressor C includes the bearing housing 3 and the compressor housing 7.

A protrusion 3a is formed on an outer curved surface of the bearing housing 3. The protrusion 3a is formed on a side closer to the turbine housing 5. The protrusion 3a protrudes in a radial direction of the bearing housing 3. A protrusion 5a is formed on an outer curved surface of the turbine housing 5. The protrusion 5a is formed on a side closer to the bearing housing 3. The protrusion 5a protrudes in a radial direction of the turbine housing 5. The bearing housing 3 and the turbine housing 5 are band-fastened to each other by the fastening mechanism 9. The fastening mechanism 9 is, for example, a G coupling. The fastening mechanism 9 clamps the protrusions 3a and 5a.

A bearing hole 3b is formed in the bearing housing 3. The bearing hole 3b penetrates through the turbocharger TC in the left-right direction. A bearing is disposed in the bearing hole 3b. A shaft 13 is inserted through the bearing. The bearing pivotally supports the shaft 13 in a freely rotatable manner. The bearing is a slide bearing. However, the bearing is not limited thereto and may be a rolling bearing. At a left end of the shaft 13, a turbine blade wheel 15 is provided. The turbine blade wheel 15 is housed in the turbine housing 5 in a freely rotatable manner. At a right end of the shaft 13, a compressor impeller 17 is provided. The compressor impeller 17 is accommodated in the compressor housing 7 in a freely rotatable manner.

An intake port 19 is formed in the compressor housing 7. The intake port 19 opens to the right side of the turbocharger TC. The intake port 19 is connected to an air cleaner (not illustrated). Facing surfaces of the bearing housing 3 and the compressor housing 7 constitute a diffuser flow path 21. The diffuser flow path 21 pressurizes the air. The diffuser flow path 21 is formed in an annular shape. The diffuser flow path 21 communicates with the intake port 19 via the compressor impeller 17 on the radially inner side.

A compressor scroll flow path 23 is formed in the compressor housing 7. The compressor scroll flow path 23 is formed in an annular shape. The compressor scroll flow path 23 is positioned on an outer side in the radial direction of the shaft 13 with respect to the diffuser flow path 21. The compressor scroll flow path 23 communicates with an intake port of an engine (not illustrated) and the diffuser flow path 21. When the compressor impeller 17 rotates, the air is sucked from the intake port 19 into the compressor housing 7. The sucked air is pressurized and accelerated in the process of flowing between blades of the compressor impeller 17. The pressurized and accelerated air is further pressurized by the diffuser flow path 21 and the compressor scroll flow path 23. The pressurized air is guided to the intake port of the engine.

In the turbine housing 5, a discharge flow path 25, an accommodation unit 27, and an exhaust flow path 29 are formed. The discharge flow path 25 opens to the left side of the turbocharger TC. The discharge flow path 25 is connected to an exhaust gas purification device (not illustrated). The discharge flow path 25 communicates with the accommodation unit 27. The discharge flow path 25 is continuous with the accommodation unit 27 in the rotation axis direction of the turbine blade wheel 15. The accommodation unit 27 accommodates the turbine blade wheel 15. The exhaust flow path 29 is formed on a radially outer side with respect to the turbine blade wheel 15. The exhaust flow path 29 is formed in an annular shape. The exhaust flow path 29 includes a turbine scroll flow path 29a. The turbine scroll flow path 29a communicates with the accommodation unit 27. That is, the turbine blade wheel 15 is disposed on a radially inner side with respect to the turbine scroll flow path 29a.

The exhaust flow path 29 communicates with an exhaust manifold of the engine (not illustrated). The exhaust gas discharged from the exhaust manifold of the engine (not illustrated) is guided to the discharge flow path 25 via the exhaust flow path 29 and the accommodation unit 27. The exhaust gas guided to the discharge flow path 25 rotates the turbine blade wheel 15 in the process of flowing therethrough.

The turning force of the turbine blade wheel 15 is transmitted to the compressor impeller 17 via the shaft 13. When the compressor impeller 17 rotates, the air is pressurized as described above. In this manner, the air is guided to the intake port of the engine.

Figure 2:
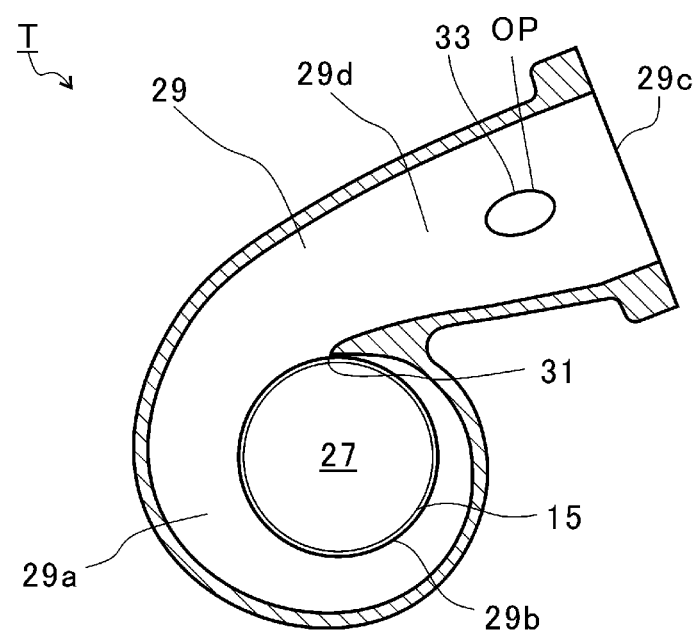
FIG. 2 is a cross-sectional view taken along line A-A in FIG. 1.

FIG. 2 is a cross-sectional view taken along line A-A in FIG. 1. In FIG. 2, as for the turbine blade wheel 15, only the outer circumference is illustrated as a circle. As illustrated in FIG. 2, the exhaust flow path 29 is formed on the radially outer side of the accommodation unit 27 (namely, the radially outer side of the turbine blade wheel 15). The exhaust flow path 29 includes the turbine scroll flow path 29a, a communicating portion 29b, an exhaust introduction port 29c, and an exhaust introduction path 29d.

The communicating portion 29b is formed in an annular shape over the entire circumference of the accommodation unit 27. The turbine scroll flow path 29a is positioned on a radially outer side of the turbine blade wheel 15 with respect to the communicating portion 29b. The turbine scroll flow path 29a is annularly formed over the entire circumference of the communicating portion 29b (namely, the entire circumference of the accommodation unit 27). The communicating portion 29b communicates the accommodation unit 27 with the turbine scroll flow path 29a. A tongue portion 31 is formed in the turbine housing 5. The tongue portion 31 is provided at an end on the downstream side of the turbine scroll flow path 29a and partitions into a portion on the downstream side and a portion on the upstream side of the turbine scroll flow path 29a.

The exhaust introduction port 29c opens to the outside of the turbine housing 5. Exhaust gas discharged from the exhaust manifold of the engine (not illustrated) is introduced to the exhaust introduction port 29c. The exhaust introduction path 29d is formed between the exhaust introduction port 29c and the turbine scroll flow path 29a. The exhaust introduction path 29d connects the exhaust introduction port 29c and the turbine scroll flow path 29a. The exhaust introduction path 29d is formed, for example, in a linear shape. The exhaust introduction path 29d guides the exhaust gas introduced from the exhaust introduction port 29c to the turbine scroll flow path 29a. The turbine scroll flow path 29a guides the exhaust gas introduced from the exhaust introduction path 29d to the accommodation unit 27 via the communicating portion 29b.

A bypass flow path 33 is formed in the turbine housing 5. An inlet end OP of the bypass flow path 33 opens to the exhaust flow path 29 (specifically, the exhaust introduction path 29d). An outlet end of the bypass flow path 33 opens to the discharge flow path 25 (see FIG. 1). The bypass flow path 33 communicates (connects) the exhaust introduction path 29d and the discharge flow path 25. A wastegate port WP (see FIG. 1) is formed at the outlet end of the bypass flow path 33. A wastegate valve WV (see FIG. 1) capable of opening and closing the wastegate port WP is disposed at the outlet end of the bypass flow path 33. The wastegate valve WV is arranged inside the discharge flow path 25. When the wastegate valve WV opens the wastegate port WP, the bypass flow path 33 allows a part of the exhaust gas flowing through the exhaust introduction path 29d to bypass the accommodation unit 27 (namely, the turbine blade wheel 15) and to flow into the discharge flow path 25.

In the turbine T, with the opening and closing operation of the wastegate port WP controlled, the flow rate of the exhaust gas flowing into the turbine blade wheel 15 is adjusted. As described above, the turbine T is a variable capacity turbine. The bypass flow path 33 and the wastegate valve WV correspond to a flow rate adjusting mechanism for adjusting the flow rate of the exhaust gas flowing into the turbine blade wheel 15. However, the flow rate adjusting mechanism is not limited to the above example as described later.

Figure 3:
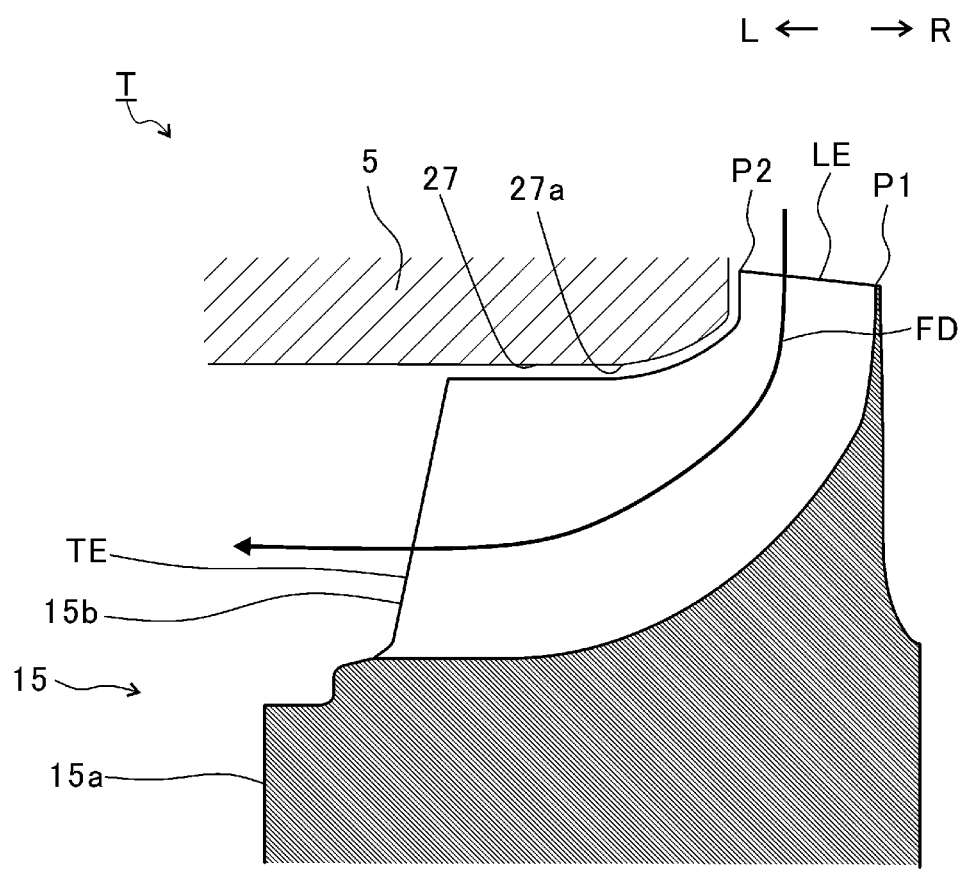
FIG. 3 is a view extracted from a one-dot chain line part of FIG. 1.

FIG. 3 is an extracted diagram of an alternate long and short dash line portion of FIG. 1. As illustrated in FIG. 3, the turbine blade wheel 15 includes a hub 15*a* and a plurality of blades 15*b*. Hereinafter, the axial direction, the circumferential direction, and the radial direction of the turbine blade wheel 15 are also simply referred to as the axial direction, the circumferential direction, and the radial direction. The hub 15*a* is connected with the left end of the shaft 13 (see FIG. 1). The outer diameter of the hub 15*a* decreases as it is closer to the left side of the turbocharger TC. A plurality of blades 15*b* is provided on the outer curved surface of the hub 15*a*. The plurality of blades 15*b* are provided at intervals in the circumferential direction. A blade 15*b* is formed to extend radially outward from the outer curved surface of the hub 15*a*. The outer edge of the blade 15*b* includes a leading edge LE and a trailing edge TE.

The leading edge LE is an upstream edge of the blade 15*b* in the flow direction of the exhaust gas. The leading edge LE is an edge of the blade 15*b* on the turbine scroll flow path 29*a* side. Exhaust gas flows toward the leading edge LE from the turbine scroll flow path 29*a*. That is, the portion of the turbine blade wheel 15 where leading edges LE are arrange corresponds to the inlet portion (namely, a portion of the turbine blade wheel 15 into which the exhaust gas flows) of the exhaust gas in the turbine blade wheel 15. The leading edge LE is formed on the right end side of the blade 15*b*. The leading edge LE extends in the axial direction of the turbine blade wheel 15 when viewed in the circumferential direction. In the example of FIG. 3, the leading edge LE is inclined radially outward as it extends in the axial direction. However, the leading edge LE may be parallel to the axial direction when viewed in the circumferential direction.

The right end of the leading edge LE is a hub-side end P1 (namely, an end on the hub 15*a* side). The left end of the leading edge LE is a shroud-side end P2 (namely, an end on a shroud 27*a* side which is a portion of the turbine housing 5, the portion forming the accommodation unit 27). The leading edge LE extends from the hub-side end P1 to the shroud-side end P2.

The trailing edge TE is a downstream edge of the blade 15*b* in the flow direction of the exhaust gas. The trailing edge TE is an edge of the blade 15*b* on the discharge flow path 25 side. The exhaust gas flows out from the trailing edge TE toward the discharge flow path 25. The trailing edge TE is formed on the left end side of the blade 15*b*. The trailing edge TE extends in the radial direction when viewed in the circumferential direction. Specifically, the trailing edge TE extends in the radial direction while being twisted in the circumferential direction.

A portion of the outer peripheral edge of the blade 15*b* between the leading edge LE and the trailing edge TE extends along the shroud 27*a* of the turbine housing 5.

As indicated by an arrow FD in FIG. 3, the exhaust gas flows into the turbine blade wheel 15 from the radially outer side. As described above, the turbine T is a radial turbine.

Note that the turbine T may be a diagonal flow turbine into which the exhaust gas flows from the radially outer side in a direction inclined with respect to the radial direction.

Here, in the turbine T of the type in which gas flows into the turbine blade wheel 15 from the radially outer side, at the inlet portion of the exhaust gas in the turbine blade wheel 15, depending on operation conditions, separation of the gas flow may occur, and a vortex may be generated. In the turbine T which is a variable capacity turbine, operating conditions (specifically, for example, the flow rate of the exhaust gas flowing into the turbine blade wheel 15) vary over a wide range. Therefore, in the turbine T which is a variable capacity turbine, separation of the gas flow at the inlet portion of the exhaust gas in the turbine blade wheel is particularly likely to occur. Such separation of the gas flow causes a decrease in the efficiency of the turbine T. In the turbine T which is a variable capacity turbine, there is a particularly high need to improve the efficiency of the turbine T.

Therefore, in the turbine T according to the present embodiment, the shapes of the blades 15*b* of the turbine blade wheel 15 are devised in order to improve the efficiency of the turbine T. Hereinafter, the shape of a blade 15*b* of the turbine blade wheel 15 will be described in detail with reference to FIGS. 4 and 5.

Figure 4:
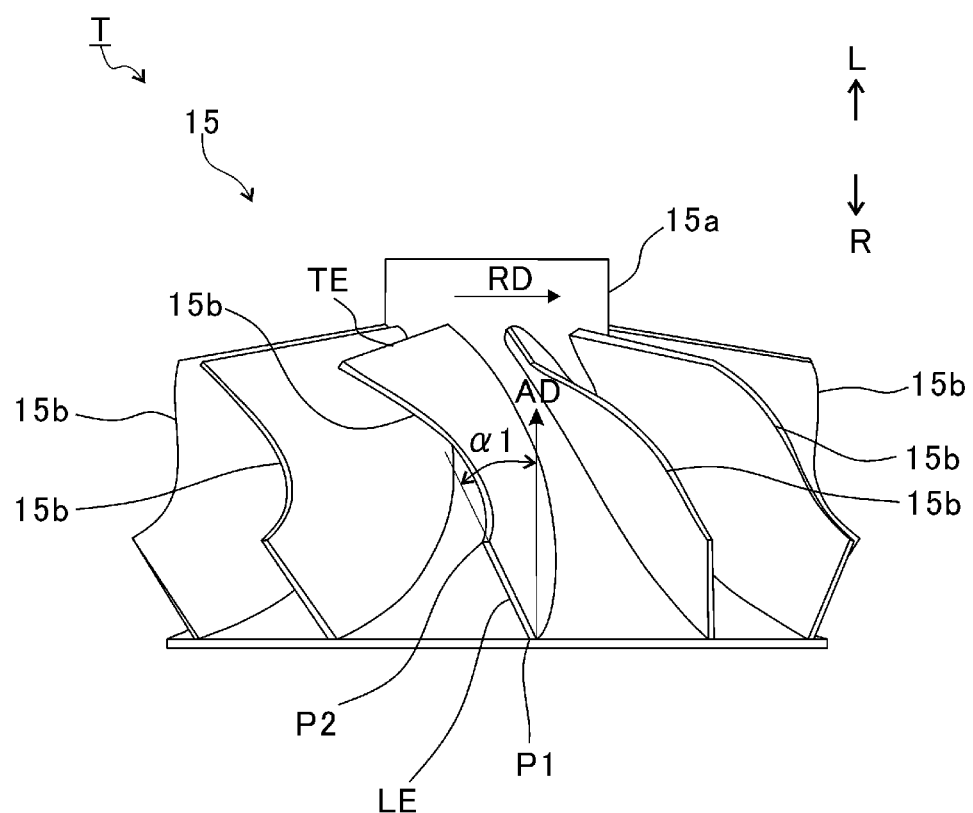
FIG. 4 is a side view illustrating a turbine blade wheel according to an embodiment of the present disclosure.

FIG. 4 is a side view illustrating the turbine blade wheel 15 according to the embodiment. A leading edge LE of a blade 15*b* of the turbine blade wheel 15 is inclined to a side opposite to a rotation direction RD side of the turbine blade wheel 15 as it extends from the hub 15*a* side to the shroud 27*a* side. That is, in each of the blades 15*b*, the circumferential position of a hub-side end P1 of a leading edge LE is advanced in the rotation direction RD with respect to the circumferential position of a shroud-side end P2 of the leading edge LE. In the example of FIG. 4, the rotation direction RD is a counterclockwise direction when the turbine blade wheel 15 is viewed from the left side (namely, from the above in FIG. 4) of the turbocharger TC.

A leading edge LE has a linear shape. Specifically, a leading edge LE extends along a straight line connecting a hub-side end P1 and a shroud-side end P2. However, the shape of the leading edge LE is not limited to the linear shape. For example, a part of the leading edge LE may be curved or bent.

The inventor has found that the efficiency of the turbine T varies depending on the inclination angle $\alpha 1$ of the leading edge LE with respect to an axial direction AD of the turbine blade wheel 15 when viewed in the radial direction by performing flow analysis simulation. In the flow analysis simulation, the state of the gas flow in the turbine blade wheel 15 when the inclination angle $\alpha 1$ is varied in variously manners (for example, the direction, the velocity, the entropy, and others) and the efficiency of the turbine T were calculated. In particular, it became clear from the flow analysis simulation that the efficiency of the turbine T is improved in a case where the leading edge LE is inclined to the side opposite to the rotation direction RD side of the turbine blade wheel 15 as the leading edge LE extends from the hub 15*a* side to the shroud 27*a* side and the inclination angle $\alpha 1$ is set within a specific range. As a result, in the turbine T according to the present embodiment, the inclination angle $\alpha 1$ of the leading edge LE is larger than 0° and equal to or smaller than 45°. As a result, the efficiency of the turbine T is improved.

Figure 5:
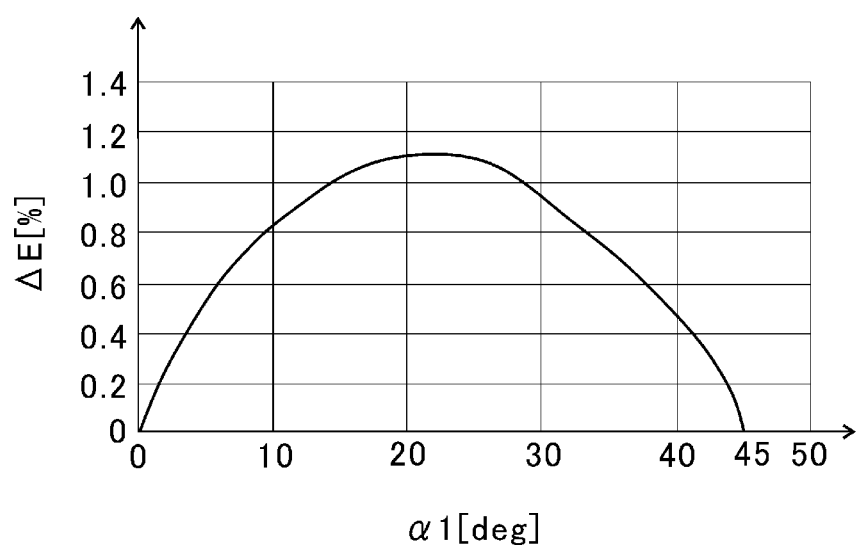
FIG. 5 is a graph illustrating the relationship between the inclination angle of a leading edge and the difference in efficiency of a turbine.

FIG. 5 is a graph illustrating the relationship between the inclination angle $\alpha 1$ [deg] of the leading edge LE and the difference in efficiency $\Delta E$ [%] of the turbine T. FIG. 5 is a graph obtained by the flow analysis simulation. The difference in efficiency $\Delta E$ of the turbine T is a change amount of the efficiency of the turbine T at each inclination angle $\alpha 1$ with respect to the efficiency of the turbine T of a case where the inclination angle $\alpha 1$ is 0°. That is, the difference in efficiency $\Delta E$ is obtained by subtracting the efficiency of the turbine T of the case where the inclination angle $\alpha 1$ is 0° from the efficiency of the turbine T at each inclination angle α1. The efficiency of the turbine T is the ratio of energy generated by the turbine T to energy input to the turbine T.

According to the graph illustrated in FIG. 5, it can be seen that the efficiency of the turbine T is higher in a case where the inclination angle α1 of the leading edge LE is larger than 0° and less than or equal to 45° as compared to a case where the inclination angle α1 is less than or equal to 0° or a case where the inclination angle α1 is larger than 45°. Note that the case where the inclination angle α1 is less than or equal to 0° is a case where the leading edge LE is parallel to the axial direction AD or a case where the leading edge LE is inclined toward the rotation direction RD side of the turbine blade wheel 15 as it extends from the hub 15a side to the shroud 27a side.

In the flow analysis simulation, it was observed that in the case where the inclination angle α1 of the leading edge LE is larger than 0° and less than or equal to 45°, separation of the gas flow and generation of a vortex caused by the separation are suppressed in the portion where the leading edge LE is disposed in the turbine blade wheel 15 (namely, the inlet portion of the exhaust gas in the turbine blade wheel 15). That is, it is conceivable that, in the case where the inclination angle α1 of the leading edge LE is larger than 0° and less than or equal to 45°, the separation of the gas flow is suppressed, and thus, as a result, the efficiency of the turbine T is improved.

According to the flow analysis simulation, it can be seen that in a case where the leading edge LE is inclined to the side opposite to the rotation direction RD side of the turbine blade wheel 15 as it extends from the hub 15a side to the shroud 27a side, the impact when the exhaust gas flowing in from the leading edge LE collides with the blade 15b is mitigated, and generation of a vortex of the flow of the exhaust gas is suppressed. Meanwhile, it can be seen that in a case where the inclination angle α1 of the leading edge LE is excessively large, the flow of the exhaust gas is less likely to follow along the blade 15b after the exhaust gas flowing in from the leading edge LE collides with the blade 15b, and separation of the gas flow is more likely to occur.

In the graph illustrated in FIG. 5, in a case where the inclination angle α1 is around 20°, the difference in efficiency ΔE of the turbine T has the maximum value. As described above, according to the graph illustrated in FIG. 5, it can be seen that the efficiency of the turbine T is particularly improved in a case where the inclination angle α1 of the leading edge LE is within a range of 10° to 30°.

In the flow analysis simulation, it was observed that in the case where the inclination angle α1 of the leading edge LE is within the range of 10° to 30°, separation of the gas flow and generation of a vortex caused by the separation are effectively suppressed in the portion where the leading edge LE is disposed in the turbine blade wheel 15 (namely, the inlet portion of the exhaust gas in the turbine blade wheel 15). That is, it is conceivable that, in the case where the inclination angle α1 of the leading edge LE is within the range of 10° to 30°, the separation of the gas flow is efficiency suppressed, and thus the efficiency of the turbine T is effectively improved.

As described above, in the turbine T, a leading edge LE has a linear shape. This makes it possible to appropriately implement improvement of the efficiency of the turbine T by optimizing the inclination angle α1 on the basis of the knowledge obtained from the flow analysis simulation.

Although the embodiments of the present disclosure has been described with reference to the accompanying drawings, it is naturally understood that the present disclosure is not limited to the above embodiments. It is clear that those skilled in the art can conceive various modifications or variations within the scope described in the claims, and it is understood that they are naturally also within the technical scope of the present disclosure.

In the above description, the example in which the turbine T is of a single scroll type (a type in which the number of turbine scroll flow paths 29a is one) has been described, however, the type of the turbine T is not limited to the above example. For example, the turbine T may be of a double scroll type (a type in which two turbine scroll flow paths 29a are connected with the accommodation unit 27 at different circumferential positions) or of a twin scroll type (a type in which two turbine scroll flow paths 29a are arranged side by side in the axial direction).

The example in which the bypass flow path 33 and the wastegate valve WV are used as the flow rate adjusting mechanism for adjusting the flow rate of the exhaust gas flowing into the turbine blade wheel 15 has been described above. However, the flow rate adjusting mechanism is not limited to the above example. For example, as the flow rate adjusting mechanism, a mechanism including a plurality of variable nozzle blades capable of adjusting the cross-sectional area of a flow path on the upstream side with respect to the turbine blade wheel 15 may be used. The plurality of variable nozzle blades is provided on the radially outer side with respect to the turbine blade wheel 15. The plurality of variable nozzle blades is provided at intervals in the circumferential direction of the turbine blade wheel 15. As the variable nozzle blades rotate, the cross-sectional area of the flow path on the upstream side of the turbine blade wheel 15 varies depending on the rotation angle of the variable nozzle blades. As a result, the flow rate of the exhaust gas flowing into the turbine blade wheel is adjusted. Note that the turbine T may not be provided with the flow rate adjusting mechanism. Both the flow rate adjusting mechanism including the wastegate valve WV and the flow rate adjusting mechanism including the variable nozzle blades may be provided to the turbine T.

The example in which the turbine T is included in the turbocharger TC has been described above. However, the turbine T may be included in a device other than the turbocharger TC.

The invention claimed is:

1. A turbine comprising:
   a turbine scroll flow path;
   a turbine blade wheel disposed on a radially inner side with respect to the turbine scroll flow path; and
   a blade comprised in the turbine blade wheel, the blade including a leading edge inclined to a side opposite to a rotation direction side of the turbine blade wheel as the leading edge extends from a hub side to a shroud side, the leading edge having an inclination angle with respect to an axial direction of the turbine blade wheel as viewed in a radial direction within a range of 10° to 30°, the leading edge has a linear shape, and the blade includes a trailing edge having a linear shape,
   wherein the inclination angle is constant from the hub side to the shroud side.

2. A turbocharger comprising the turbine according to claim 1.

* * * * *